United States Patent [19]

Gagnon

[11] Patent Number: 4,878,186

[45] Date of Patent: Oct. 31, 1989

[54] METHOD AND CIRCUIT FOR PROCESSING NARROW BAND SIGNALS LOCATED IN A WIDE BAND HAVING DISTURBANCE

[75] Inventor: Daniel Gagnon, Montreal, Canada

[73] Assignee: Ultimage Inc., Quebec, Canada

[21] Appl. No.: 93,997

[22] Filed: Sep. 4, 1987

[30] Foreign Application Priority Data

Aug. 27, 1987 [CA] Canada .................................. 545529

[51] Int. Cl.[4] ........................ G06F 15/42; G06F 15/62
[52] U.S. Cl. ............................... 364/574; 364/413.26; 364/527
[58] Field of Search ................ 364/414, 527, 574, 581, 364/413.26; 250/363 R, 363 SB, 369; 378/5, 6, 7; 358/111

[56] References Cited

U.S. PATENT DOCUMENTS

| | | | |
|---|---|---|---|
| 4,142,102 | 2/1979 | Lange | 250/369 |
| 4,181,855 | 1/1980 | Horrocks | 250/369 |
| 4,228,515 | 10/1980 | Genna et al. | 364/527 |
| 4,316,257 | 2/1982 | Del Medico et al. | 250/363 R |
| 4,319,334 | 3/1982 | Gurry | 364/574 |
| 4,466,075 | 8/1984 | Groch et al. | 250/369 |
| 4,575,810 | 3/1986 | Staub | 250/369 |
| 4,651,006 | 3/1987 | Valenta | 250/369 |
| 4,656,650 | 4/1987 | Kikuchi et al. | 378/7 |
| 4,755,680 | 7/1980 | Logan | 250/363 R |

FOREIGN PATENT DOCUMENTS 2082873 3/1982 United Kingdom ..................... 378/6

*Primary Examiner*—Parshotam S. Lall
*Assistant Examiner*—Kevin J. Teska

*Attorney, Agent, or Firm*—Oblon, Spivak, McClelland, Maier & Neustadt

[57] ABSTRACT

A method and a system for processing information signals contained in a plurality of contiguous energy bands of a wide band signal generated by photon emission or absorption, such as from a gamma or X-ray source, and containing desired information signals and undesired noise signals. A radiation detector accepts this photon emission and produces position signals and energy signal representative thereof. The method and the system of the present invention consists in directing the position signals in a predetermined ones of a first purality of storage banks corresponding to the contiguous energy bands. The position signals are directed and cumulated into specific ones of the banks as determined by the level of its corresponding energy signal. The relation between accumulated position signals in these banks is evaluated by comparing the signals in each bank with every other ones of the banks and rating said relation of signals between banks. The information which is accumulated by these position signals is then selected in accordance with their ratings to minimize similarities between accumulated signals. This rated information is then transferred to a second plurality of storage banks which are classified in accordance with the nature of the rated signals whereby to isolate desired signals from undesired noise signals. The signal information is then weighted by optimum compression transformation to produce an interpretable signal representative of the desired information contained in the photon emission or absorption.

20 Claims, 6 Drawing Sheets

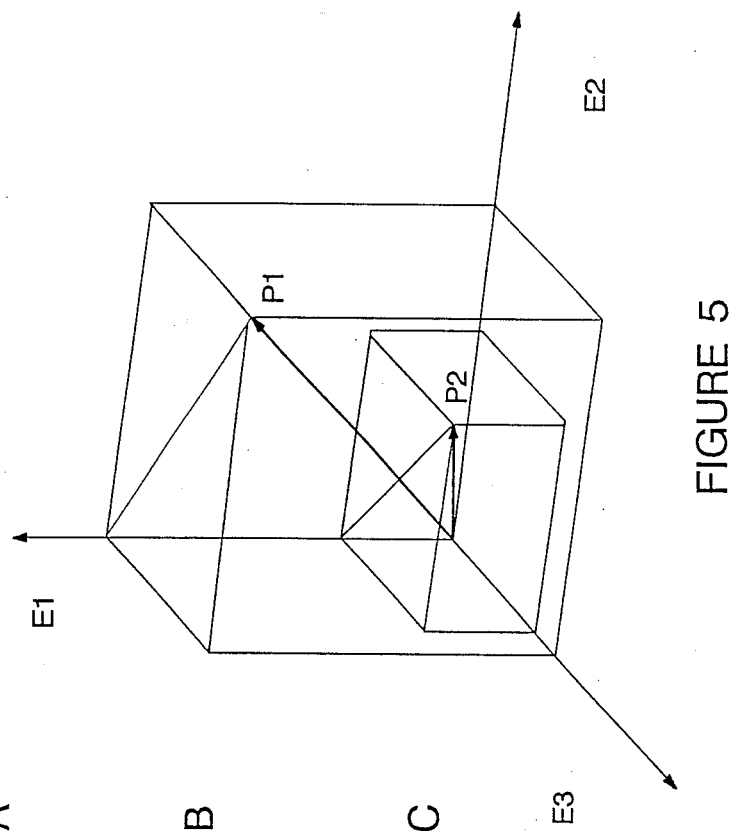
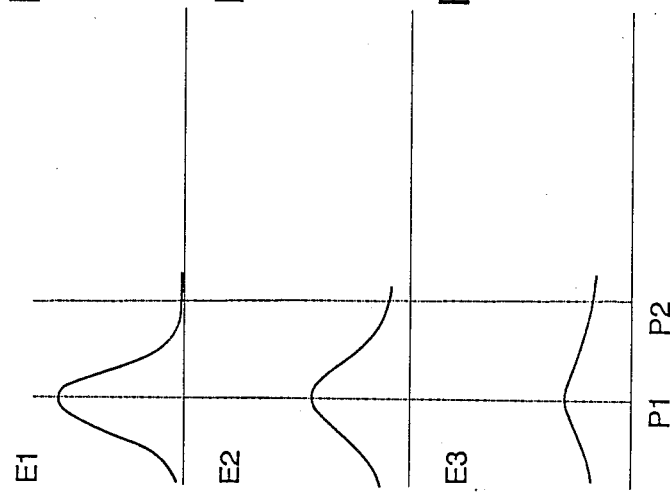

IMAGE PROFILE
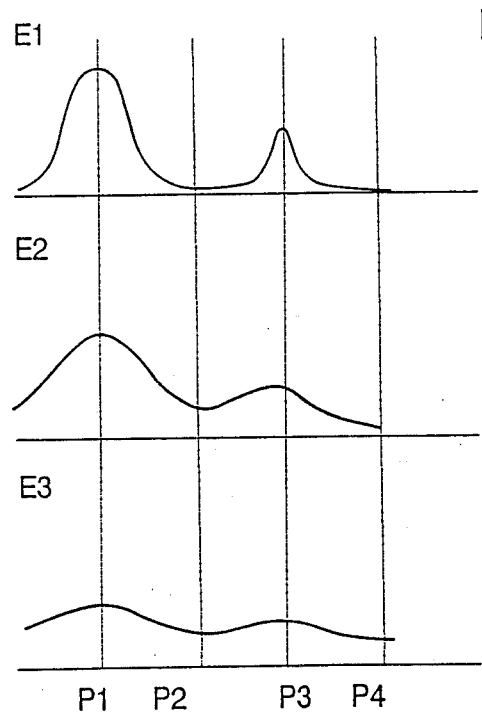
FIGURE 6 A
FIGURE 6 B
FIGURE 6 C
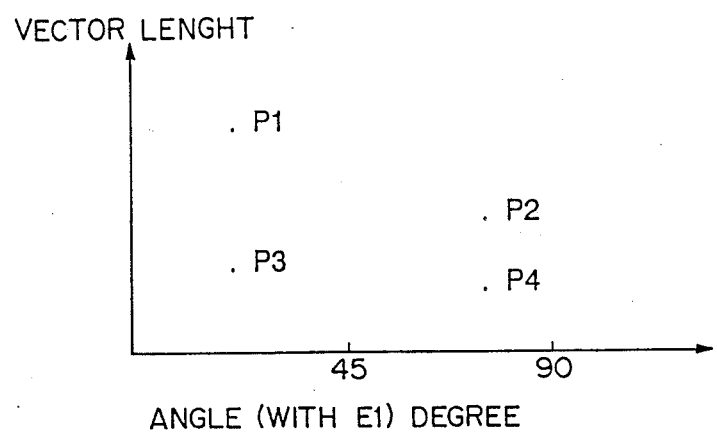
FIGURE 7

METHOD AND CIRCUIT FOR PROCESSING NARROW BAND SIGNALS LOCATED IN A WIDE BAND HAVING DISTURBANCE

BACKGROUND OF THE INVENTION

1. Field of the Invention

This invention relates to a method and a system for formatting and processing narrow band signals located in a wide band having disturbance. The signals are particularly caused by single-energy gamma-rays, as emitted by a radioactive source, and produced by a radiation detection device, such as a gamma-camera. The disturbance is particularly caused by Compton scattering of said signal.

2. Description of Prior Art

The prior Art is described with particular reference to the field of nuclear medicine imaging, where the present invention is principally, although not exclusively, applied.

Nuclear imaging aims to estimate the spatial and temporal distribution of a radioisotope by detecting its primary radiation. Basic principles of such device is described in a U.S. Pat. No. 3,011,057 to Anger. The ability to produce images by means of scintillation, as described by Anger relies essentially on the possibility of:

(a) selecting only rays lying in a given direction (or range of directions), as PHYSICAL INPUT, by mean of a COLLIMATION device, (b) converting each gamma ray into light by means of a scintillation CRYSTAL device, (c) converting light into electrical pulses by mean of an array of PHOTOMULTIPLIERS TUBES positioned behind the scintillation device, (d) measuring the amount of light produced by a particular scintillation event, which will be equated to the initial energy of each gamma ray, by means of a WEIGHTED SUMMATION circuitry of all photomultiplier tube responses, (e) determining the position of scintillation events by means of a COMPARISON of each photomultiplier response, (f) rejecting events having an energy, or SPECTRAL signal lying outside a given energy window, or within a limited set of energy windows, by means of an ENERGY DISCRIMINATOR device, (g) sending position, referred to as INFORMATION to a FORMATTING DEVICE for immediate display, such as an oscilloscope, for analog storage, such as films, or for digital storage, such as computer memory.

Most modern scintillation cameras also include circuitry for:

(h) energy correction, that is, performing step (d) taking into account differences in the regional response to a given scintillation event and adjusting the output of the weighted summation circuitry accordingly, (i) linearity correction, that is, event having been corrected for energy, (step h), defining position (step e), taking into account local distortions of the system as compared to an object of known structure and repositioning the events accordingly, (j) uniformity correction, that is, events having been corrected for energy, (step h), and linearity (step i), formatting spatial information (step g) taking into account local aberrations in sensitivity of the system, adding or subtracting events accordingly.

The energy discriminating capability of windowing a narrow band in the whole energy spectrum, point (f), was a decisive advance for nuclear imaging technology. In fact, any device lacking such capability is unfit for nuclear imaging, would it possess the best of all other characteristics. Nuclear radiography, using image intensifiers for example, failed for this reason. Windowing is imposed by the very nature of gamma ray emission process. A radioactive isotope usually emits within one (or few), quite narrow, specific energy bands. Scattering of gamma rays within matter causes a loss in photon energy and a deviation from its original direction: scattered photons lose their spatial relationship with the source from which they originate. Hence, the mandatory role of energy discrimination whereby scattered photons are denied access to the formatting device. However, because of the intrinsic uncertainties in the measurement of the energy signal, perfect separation of primary and scattered photons, thought theoretically possible, is practically unachievable, the two processes overlapping each other.

The problem of scatter contamination is well known and various methods have been proposed to deal with it. For example, (a) at the expense of a substantial decrease in sensitivity, one can increase primary to scatter ratio by shifting the window towards higher energy; (b) discrimination can also be formed by simultaneous acquisition of images, one on-peak containing both scatter and primary contributions and the other, in a lower part of the spectrum, to estimate scatter, the final result being the subtraction of the two images; (c) numerical image enhancement addresses the scatter contamination problem by applying a filter according to the point spread function in a scattering medium; or, (d) more recently, as described in U.S. Pat. No. 4,575,810, a modification of the acquisition, applying an energy dependent, weighting factor on the pulse level, can decrease the effect of scatter on the imaging process.

In this latter method, a weighted image is generated which is dependent on the energy of the pulse to be processed. It takes into account the fact that both the signal-to-noise ratios and the modulation transfer functions are energy dependent. The weighting factors are selected in order to optimize a single figure-of-merit of the overall response of the system to a point source in water and at fixed distance from the camera. The performance of such a method is thus limited by the fact that the weighting factors are optimized for a very particular situation.

In summary, all the methods available in the prior art, have various limitations because of sensitivity, noise or reliance on singular experimental setups that do not take into account the large variability in the characteristics (size, geometry, diffusing media . . . ) of the distribution of the photon source.

In the present invention, a method and a system is provided in which the transformation to be applied is based and evaluated on the data to which the transformation is to be applied: it varies from case to case, taking into account actual difference in the distribution of the source. In that sense, the present invention addresses the problem of the effect of scatter on the actual images, while most of the previous methods address the effects of scatter on photon energy or on system point response.

SUMMARY OF THE INVENTION

It is a feature of the present invention to provide an improved method and system for processing pulses by applying a technique making use of the information contained in the entire spectrum, in order to reduce substantially or eliminate scatter contamination.

It is a further feature of the present invention to provide an improved method and a system for scatter removal that is totally self-adapting and optimized to each and every source configuration, eliminating the need for predetermined sets of parameters as used in the prior Art.

It is a still further object of the present invention to provide a method and a system for forming a set of contiguous images in the spectral domain using the digital energy signal as a switch to different parts of the formatting device memory, each part of the formatting device being otherwise equivalent to what already exists in the Prior Art.

It is another feature of the present invention to provide a method and a system which we identify as HOLOSPECTRAL IMAGING (for whole spectrum imaging), that can be applied to the images that serve to compute the said transformation, or to a sequence of pulses known to eventually form another set of statistically equivalent images or similar to an acceptable degree to the ones on which the said transformation has been estimated.

It is a further feature of the invention to provide an improved method and a system for scatter removal which substantially improves clinical images in nuclear medicine.

According to the above features, from a broader perspective, the present invention provides a method and a system for processing information signals contained in a plurality of contiguous energy bands of a wide band signal generated by photon emission or absorption and containing desired information signals and undesired noise signals and wherein a radiation detector produces position signals and energy signals representative of the photo emission or its absorption. The method comprises the step of directing the position signals in predetermined ones of a first plurality of storage banks corresponding to the contiguous energy bands. Such position signals are directed into specific ones of the banks as determined by the level of each photon's corresponding energy signal. The relationships between the cumulated position signals in these banks are rated by comparing the counts in each bank with every other ones of the banks, estimating said relationships of signals between energy banks. Information in each energy bank is then weighted in accordance with their ratings to minimize similarities between cumulated signals. Rated information is then transferred to a second plurality of storage banks which are mathematically ordered so as to segregate desired signals from undesired noise signals. The signal information in the second plurality of storage banks is then weighted by optimum compression-transformation to produce an interpretable signal representative of the desired information contained in the photon emission or absorption.

BRIEF DESCRIPTION OF THE DRAWINGS

A preferred embodiment of the present invention will now be described with reference to the accompanying drawings in which:

FIGS. 1b and 1c are characteristic curves illustrating the position and the energy of the photonic emission of the radioactive source.

FIG. 2a is a schematic representation as in FIG. 1a but showing the radioactive source in a scattering medium;

FIGS. 2b and 2c are characteristic curves similar to FIGS. 1b and 1c but relating to the photonic emission of the scattered radioactive source of FIG. 2a;

FIG. 4 (comprising FIGS. 4A, 4B and 4C) is an estimation of image profiles of a point source at three energies and identifying two pixels;

FIG. 5 is a three-dimensional representation of the two pixels of FIG. 4;

FIG. 6 (comprising FIGS. 6A, 6B and 6C) is a representation of estimated image profiles of two point sources of different intensities at three energies and identifying four pixels;

FIG. 7 is a graph showing the angle versus the norm of the four pixels identified in FIG. 6.

DESCRIPTION OF THE PREFERRED EMBODIMENT

Figure 1:
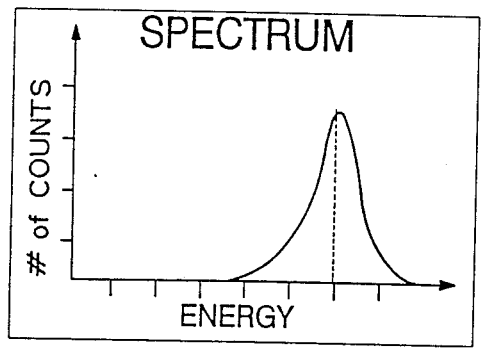
FIG. 1 is a schematic representation of a radioactive source in vacuum and positioned in front of a detection camera.
Figure 1:
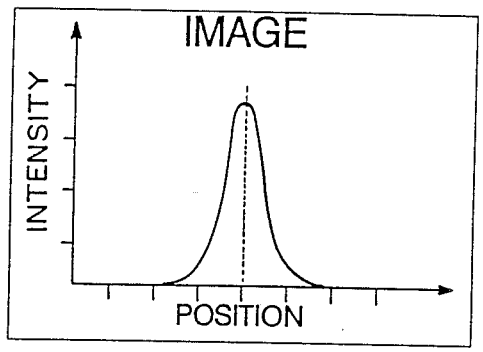
Figure 1:
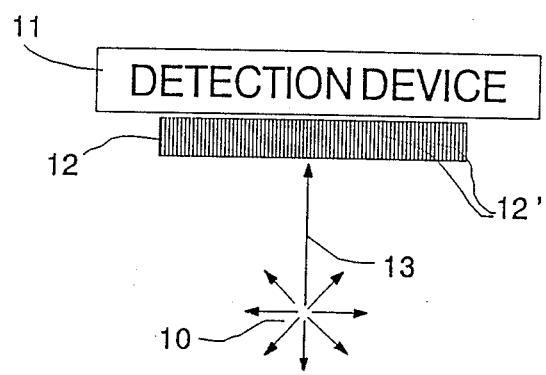
Figure 2:
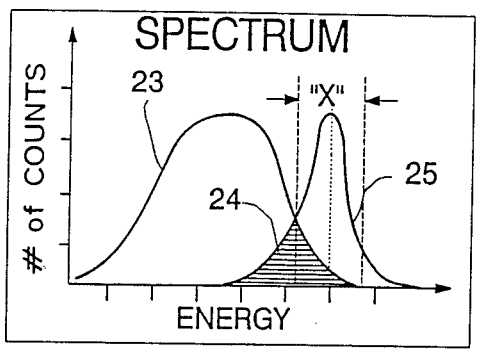
Figure 2:
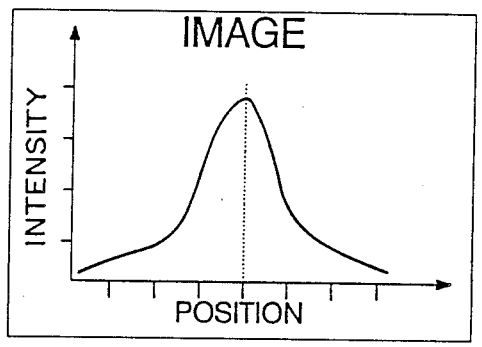
Figure 2:
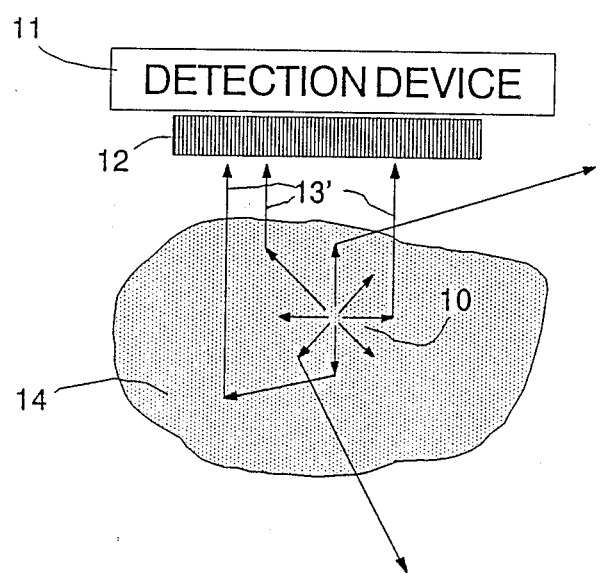

Referring now to FIGS. 1A to 3, there will be described briefly the prior art and the problem addressed. In FIG. 1A, there is shown a radioactive point source 10 such as a gamma or X-ray source radiating photons in vacuum. A detection camera 11 is positioned in front of the source and provided with a collimator plate 12, with perforations 12' provided therein, therethrough photons emitted coaxially pass. Therefore, the detection device will receive photons having an axial path, such as the one shown as 13 and the detection device will know the position of the source 10. The histogram of the photons energy or spectrum as shown in FIG. 1c can be easily measured by cumulating the energy signals over a number of photons. Also, the precise position is easily ascertainable as the source 10 is located in vacuum. However, when the source 10 is located in a scattering medium 14 as shown in FIG. 2, photons will be deflected in various directions, some of which will strike the collimator plate 12 axially therewith and at various positions as illustrated by photonic paths 13'. In this particular example, there is no photonic path directly aligned with the center of the source and, therefore, the detection device will reproduce an image which is not precise and which contains contamination or noise which must be removed in order to ascertain the true shape of the radioactive source.

Figure 3:
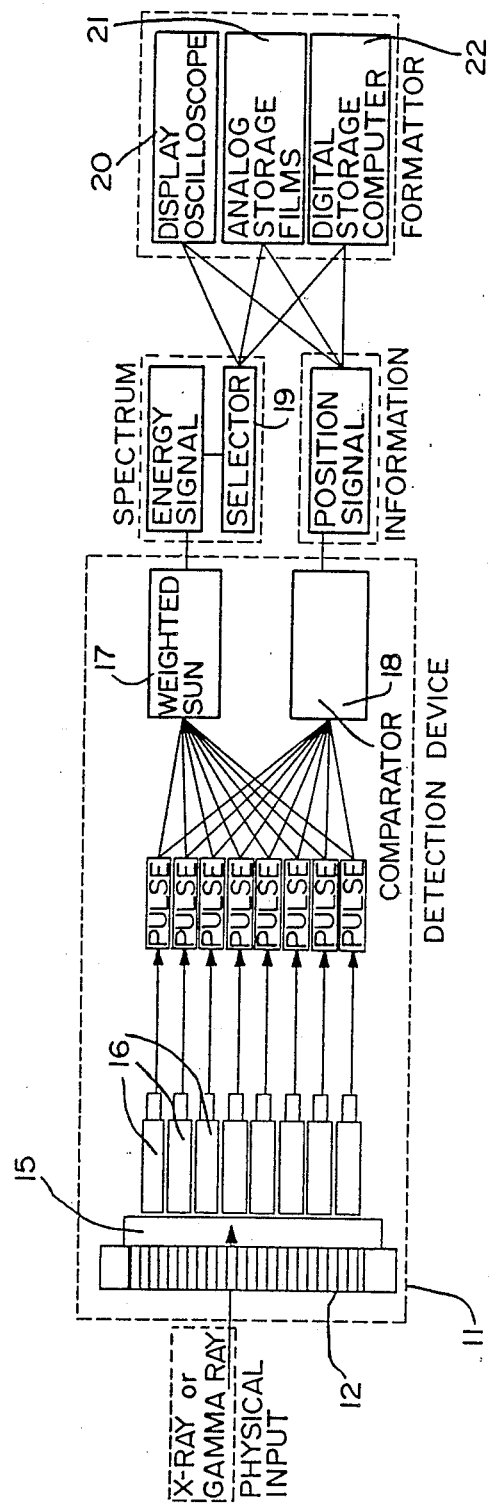
FIG. 3 is a block diagram showing prior art detection systems.

Referring to FIG. 3, there is schematized the construction of the detection device 11 typical of prior Art to produce signals representative of the image and spectrum of the source as shown in FIGS. 2b and c. This prior art detection device comprises the input collimator plate 12 as previously described and a scintillation crystal device 15 which converts the radioactive rays into light. This light is then converted into electrical pulses by means of an array of photomultiplier tubes 16 which are positioned behind the scintillation device 15. The amount of light produced by a particular scintillation of radioactive rays is converted into an electrical signal pulse which is fed to a weighted summation circuit 17 and a comparator 18.

The weighted summation circuit 17 produces signals representative of the amount of light the photons yielded. Such information, cumulated over a period of time to construct a histogram of many such photons, is represented as an example in FIG. 2c. The output of the comparator device 18 produces signals which are representative of the image or the position of the source and the intensity distribution thereof.

The energy signal at the output of the weighted summation circuit 17 is also provided with a selector device 19 which rejects events having an energy or spectral signal not lying within a given energy window, or within a limited set of energy windows, as these signals are not considered to contain any valid information. The energy and position signals may be fed to suitable formatting devices and converted into an interpretable form. Such devices can be, for example, a display oscilloscope 20, an analog storage film 21, a digital computer 22 or other suitable devices.

Referring now more specifically to FIG. 2c, it is pointed out that with prior Art, concern has been directed principally to the area of the signal contained in the band identified by the letter "X" which is the portion of the signal containing mostly primary photons. Everything else above and below this band is rejected. However, it has been found that valuable information 25 may lie outside the window "X" and that noise signal 23 can be found inside the same window as well, particularly in the overlap area 24. The present invention addresses and finds a solution to the problem of producing the best possible representation of the information contained in 25.

In the present invention, the modification of the acquisition procedure of a radiation camera is dictated by the "Holospectral Imaging" analysis which requires that the information (image) be detected and stored all across the spectrum, instead of just in a single energy window "X" or few windows of the spectrum. In HOLOSPECTRAL IMAGING, all the data describing the scatter contamination is retained for analysis, and, consequently, there is no need for predetermined sets of parameters as used in the prior art. HOLOSPECTRAL IMAGING analysis finds the optimal solution for each and every case.

As previously mentioned, the present invention must consider the whole energy spectrum of the emission field, irrespective of the primary or scattered nature of the photons. The holospectral image function is made available by adding the energy variable "e" to the "x" and "y" spatial position variables already available in prior art cameras. The holospectral image I function is exposed as:

$$I = f(x, y, e)$$

The multiple spectral frames are the holospectral image sampled at different energies and can be noted as:

$$I = f(x_i, y_j, e_k) \quad ; \quad 1 \leq i \leq n,$$
$$; \quad 1 \leq j \leq m,$$
$$; \quad 1 \leq k \leq K,$$

or, alternatively, $$I = f(p_1, E_k) \quad ; \quad 1 \leq i \leq P \, (P = nm), 1 \leq k \leq K$$
$$; \quad i = i \bmod (n), j = i/m + 1$$

In matrix notation, vectors being ordered in column, I is defined by, $$I = \begin{vmatrix} f_{11} & f_{12} & \cdots & \cdots & f_{1P} \\ f_{21} & f_{22} & \cdots & \cdots & \cdots \\ \cdots & \cdots & \cdots & \cdots & \cdots \\ \cdots & \cdots & \cdots & \cdots & \cdots \\ f_{K1} & \cdots & \cdots & \cdots & f_{KP} \end{vmatrix}$$

The lines and columns of I will have special significance in the following, so we name these vectors e and p.

$$I = (e_1, e_2, \ldots, e_P); \; I = \begin{vmatrix} p^{T1} \\ p^{T2} \\ \cdots \\ p^{TK} \end{vmatrix}$$

$$e_1 = f(p1, e_k); \; 1 \leq k \leq K = \begin{vmatrix} f_{11} \\ f_{21} \\ \cdots \\ \cdots \\ f_{K1} \end{vmatrix}$$

$$p_k = f(p_1, e_k); \; 1 \leq i \leq P = \begin{vmatrix} f_{k1} \\ f_{k2} \\ \cdots \\ \cdots \\ f_{kP} \end{vmatrix}$$

$P_k$ is the $k^{th}$ line of I, or a frame at a given energy; $e_1$ is the $i^{th}$ column of I or a spectrum at a given point.

As an illustrative example, suppose that we have a holospectral image of a point source in a scattering medium, the image being produced by a perfectly uniform camera with an infinite number of photons. For the sake of illustration, we sample the holospectral image at three contiguous windows. Image profiles are shown in FIG. 4. Parts (a) (b) and (c) represent the three different energy windows, (a) being the window that includes the primary emission peak.

Let us identify two particular pixels $P_1$ and $P_2$ in the image profiles. $P_1$ is chosen so that it is directly aligned on the source axis, $P_2$ being any off-axis point. These two points are defined by their 3-dimensional energy coordinates, as shown in FIG. 5. $P_1$ and $P_2$ have indeed a different length (norm) but also have a different angle with respect to $E_1$ the "primary emission axis". In FIGS. 6A–6C, a second point source, less intense, is added next to the first one (of FIGS. 4A–4C), adding two points $P_3$ and $P_4$ equivalent to $P_1$ and $P_2$ for the first case. Referring to FIG. 7, the angle with respect to the $E_1$ axis correctly identifies $P_1$ and $P_3$ to be on-axis, $P_2$ and $P_4$ off-axis, although of different vector length. Thus, position of each pixel on the angle axis separates pixels on and off axis, independently of the intensity (norm) of each pixel. Consequently, the angle component of the complete vector space description is equivalent to normalizing all the vectors to one, or, at the image level, to convert ordinary coordinates (pixel counts) to direction cosine (DC) coordinates. Mathematically, if I is the ordinary multispectral image, J will be its direction cosine equivalent. Accordingly, $$J = I \, \text{diag}(1/\|e_1\|),$$

where, $\|*\|$ is the Euclidian norm.

In our simple point source profile, the DC coordinates describe the "distance" from the primary emission axis: pixels having a small angle are close to the emission axis, that is, have a high probability of being primary photons; on the other hand, non-zero norm pixels with a large angle have a corresponding probability of being Compton scattering contamination. This observation introduces the global image descriptor based on multivariate analysis.

The angle characteristic describes the relation of the multidimensional distribution with respect to one given axis. A global, multidimensional, description of the holospectral image distribution is needed. The analysis of what is expected in the ase of a holospectral image obtained with a perfectly uniform camera, without any scattered photon and infinite statistics, suggest a solution.

Referring to our point source profile, it is observed that in complete absence of scattering, there is no possible modification in the imaging process along the energy axis, so all non-zero profiles must be similar. The only difference between the frames of the holospectral image would be the intensity of the profile. Therefore, if all energy frames are similar, the direction cosines image with respect to every axis will be flat and the multidimensional representation of the holospectral function will be a straight line in the energy space.

With a limited number of photons, the statistical error on pixel count will cause a spreading in the line definition. This statistical spreading is expected to be distributed "around" the line, so that the direction cosines images will appear centered around a constant value with some random variations.

The Compton scattering is a further process that modifies the distribution of a holospectral image (apart from instrumental non-idealities which do modify the holospectral images but are not considered here for the purpose of the demonstration). Scatter noise is fundamentally different from statistical noise: the vector in the energy space is not only spread around its mean value, it is skewed towards lower energies.

Multivariate analysis (MVA) offers a mean to describe globally the form of this "hypercloud". Based on the relations between the different projections (energy frames in our case) of the function, MVA will retrieve, by solid rotation of the system of axis, the principal axis, that is the direction that best explains the variations. The two most popular descriptive parameters of the relationships between projections are the covariance and the correlation matrix.

The mathematical description of the MVA is quite well established. If $C_k$ is the relation matrix, the transformation (rotation) matrix $\Phi$ that describes the new system simply satisfies the eigenvalue equation: $\Phi^T C_k \Phi = V$ where V is the eignevalue vector and $\Phi$ the eigenvector matrix. The numerical value of one element of V describes the "length" of the corresponding vector of $\Phi$ (the variance if $C_k$ is the covariance matrix). The new image I' in $R^k$, $I' = \Phi^T I$, will be the projection of the original observation into the optimally rotated system. If the eigenvectors are ordered in decreasing magnitude of their associated eigenvalues so that $V_1 \geq V_2 \geq \ldots \geq V_k$, and if $\mu$ is the mean vector of I, the new observation matrix I', $I' = \Phi^T(I - \mu 1^T)$, where 1 is a diagonal matrix filled with 1's, is called the principal components matrix and has the following properties.

The covariance matrix of I' is diagonal and formed by the eigenvalue vector V, the component of I' being uncorrelated (orthogonal). Accordingly, each projection of I' (energy frames in the present case) offers the best possible solution to the separability of each source of variation.

The first component of I', that is the projection onto the first axis, contains the largest single source of variance. Each successive component is similarly the best estimation of the residual variance. So, the principal component (energy frame) represents the best possible orthogonal decomposition and the best compression of the information.

MVA techniques are used to perform a rotation of the original axis system so that a given criterion is optimized. The first hypothesis is that the information related to the primary emission will represent the principal contribution to the variation of the chosen criterion, so that the best estimate of the primary information will be, in the rotated system, projected on the first axis, whereas the second, is the scatter information.

The problem of Compton scattering separation from primary emission is now specifically addressed. Qualitatively, what is similar from frame-to-frame is related to the primary information and what is dissimilar is either related to quantum noise or to scatter information. Mathematically, the principal system coming from the analysis of a similarity matrix of a holospectral image, such as the covariance matrix, will provide the best possible separation of the processes achievable from the empirical evidence supported by the actual set of discrete frames obtained across the energy spectrum.

Figure 8:
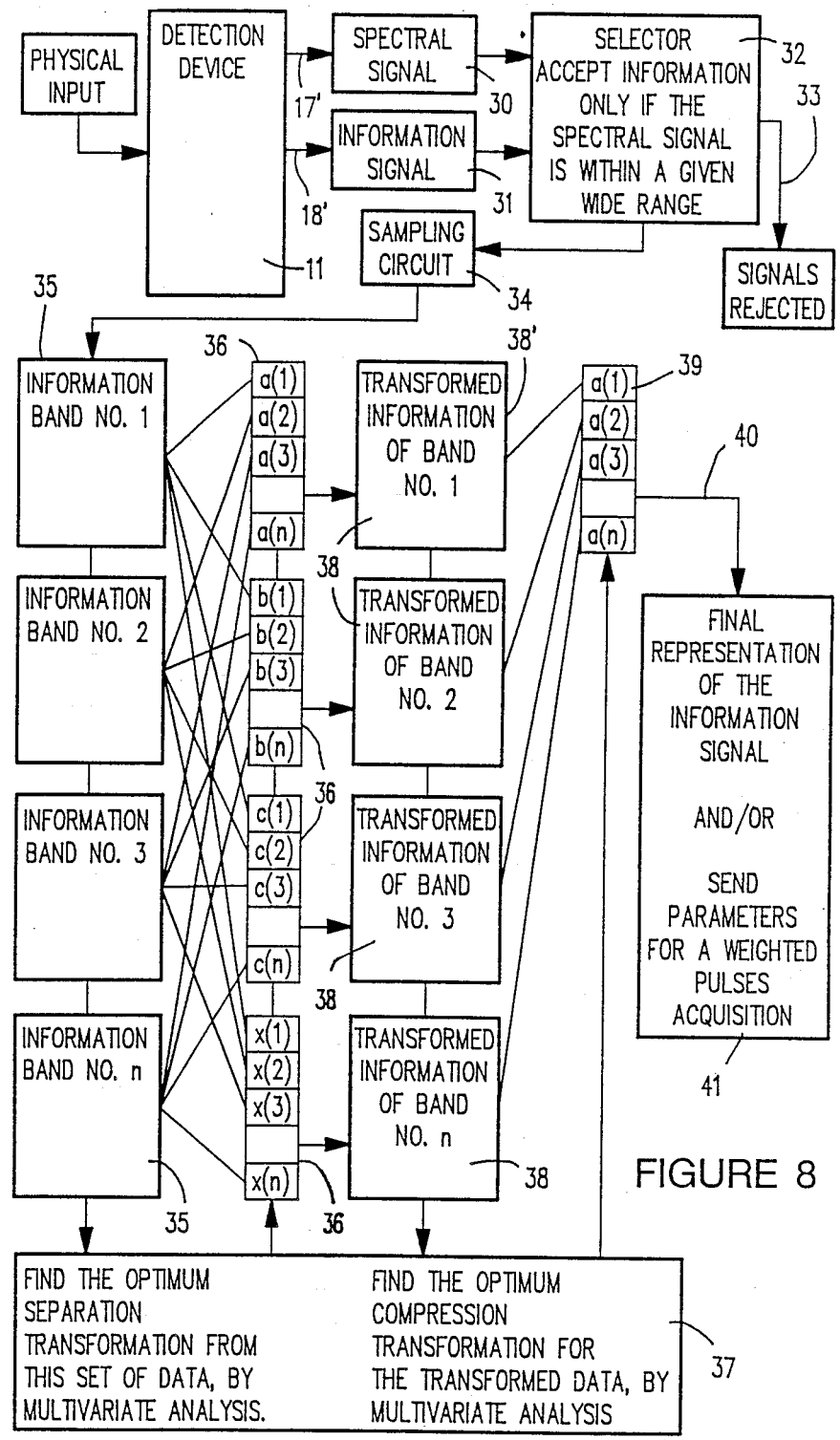
FIG. 8 is a block diagram of the system of the present invention.

With particular reference now to FIG. 8, there will be described the system of the present invention. As previously mentioned with respect to FIG. 3, with prior Art, it is only a specific portion of the spectral band which is sent to the formattor device. As shown in FIG. 8, with the present invention, the spectral signals 30, as well as their corresponding information signals 31 at the output 17' and 18' of the detection device 11, are connected to a selector 32. The selector accepts the energy signals or spectral signals 30 that are within the Holospectral wide band and rejects the signals outside this band or bypasses them on output connection 33. A sampling circuit 34 determines the level of the energy of the spectral signals 30 and produces a composite digitized signal representative thereof. These signals are then connected to a first set of a plurality of storage banks 35 and the digitized signal or energy signals connect their corresponding information signals to appropriate ones of these storage banks which accumulate position signals therein. Accordingly, the digitized energy signal addresses the selected ones of the storage banks 35. The stored information signals are then analyzed or evaluated by correlation or covariance of a matrix containing the position signals and in accordance with the mathematical analysis described hereinabove. Arrays of weight 36 are generated with which information signals are rated to generate the rotated signals. The processor circuit 37 effects this evaluation by comparing the signals in each bank with every other one of the banks 35 and this rated value, as illustrated by arrays of weight 36, is then transferred to a second plurality of storage banks 38. This seconds set of banks 38 is arranged whereby the signals containing the principal source of information is placed in a first one of these banks and the other signals, rated as smaller components of information, are transferred in decreasing order in the other banks. Accordingly, the desired information is now located in the first one of these banks, namely 38'. The signals from these banks are then weighted in a weighted summation circuit 39 to remove undesired noise signals which are contained with the desired information signals transferred into a specific portion of the weighting summation circuit 39.

The processing circuit 37 may be a computer having a core memory and/or non-electronic storage medium such as a disc or a magnetic tape. Also, the weighting circuit 39 is a processing function of the computer. The output signal 40 is now in an interpretable form and may be fed to a display device such as 41. Preferably, there are more than three, typically between eight and sixteen, of these banks 35 and 38 in each set of banks and the function of selecting information from the accumulated position signals in the first bank 35 to minimize similarities between accumulated position signals in these banks is effected by multivariate analysis by performing the above-mentioned equation $\Phi^T C_k \Phi = V$, where V is eigenvalue vector and $\Phi$ the eigenvector matrix. Also, the transfer is effected into the second storage banks 38 to classify the rated signals in order to segregate the desired signals from undesired noise signals is effected by the processor in performing the above-mentioned equation $I' = \Phi^T I$.

It is within the ambit of the present invention to cover other modifications of the preferred embodiment described herein, provided such modifications fall within the scope of the appended claims. For example, although the embodiment described relates to treating a signal produced by an imaging radiation detector as utilized in nuclear medicine, it is also envisaged to use the method and system of the present invention is radiology where X-rays are generated from a source located on the opposed side of an object from the detector and transmitted through the object. Also, the method and system of the present invention could be used for monitoring the intensity and distribution of radioactive devices such as nuclear reactors, irradiators.

The embodiments of the invention in which an exclusive property or privilege is claimed are defined as follows:

1. A method of processing information signals contained in a plurality of contiguous energy bands of a wide band signal generated by photon emission and containing desired information signals and undesired noise signals and wherein a radiation detector produces position signals and energy signals representative of said photon emission, said method comprising the steps of:
   (i) directing said position signals in predetermined ones of a first plurality of storage banks corresponding to said contiguous energy bands, said position signals being directed and cumulated into specific ones of said banks as determined by the level of its corresponding energy signal,
   (ii) evaluating the relation between the cumulative position signals in said storage banks by comparing the signals in each bank with every other one of said banks and rating the similarity of signals between said banks,
   (iii) selecting information from said cumulative position signals in each banks in accordance with said rating to minimize similarities between said cumulative position signals,
   (iv) transferring in a second plurality of storage banks, classified in accordance with the nature of said rated information from said first storage banks whereby to isolate desired signals from undesired noise signals known to be different in nature, and
   (v) weighting said signal information in said second banks to produce an interpretable signal representative of said desired information signal contained in said photon emission.

2. A method as claimed in claim 1 wherein said step (ii) of evaluating and rating accumulated position signals is effected by correlation or covariance of a matrix containing said position signals.

3. A method as claimed in claim 1 wherein said step (iii) is effected by multivariate analysis by performing the following equation: $\Phi^T C_k \Phi = V$, where V is eigenvalue vector, $\Phi$ the eigenvector matrix and C the correlation or covariance matrix and superscript T denotes the transpose operation.

4. A method as claimed in claim 1 wherein said step (v) is effected by weighted summation of said information signals transferred in said second banks to remove undesired noise signals contained with said desired information signals transferred in said specific one of said second banks.

5. A method as claimed in claim 1 wherein there is further provided the step (vi) of feeding said interpretable signal to a reproducing device to form a read-out of said interpretable signal.

6. A method as claimed in claim 1 wherein said step (i) comprises coding said energy signals in accordance with the energy level of said signals to produce a digital code of which the most significant digits determine its associated one of said first storage banks.

7. A method as claimed in claim 6 wherein said step (i) comprises accumulating position in each said first storage banks, said storage banks being portions of a computer memory.

8. A method as claimed in claim 1 wherein said step (iv) is effected by performing the following equation: $I' = \Phi^T I$, I being the first plurality of banks, I' being the second plurality of banks and superscript T denotes the transpose operation.

9. A method as claimed in claim 8 wherein said desired information signals from each said first banks are transferred in a specific one of said second banks, and said undesired noise signals are transferred in the other ones of said second banks.

10. A system for processing information signals contained in a plurality of contiguous energy bands of a wide band signal generated by photon emission within an absorbing mass and containing desired information signals and undesired noise signals, and wherein said wide band signal is detected by a radiation detector which produces position signals and energy signal representative of said photon emission, said system comprising a sampling circuit for determining the level of said energy and position signals and for producing digital signals representative thereof, a first plurality of storage banks connected to said position signals and energy signals for accumulating digitized position signals therein, said digital energy signal addressing a selected one of said storage banks for storing its corresponding position signals therein, processing means for evaluating the relation between the cumulative position signals in said storage banks by comparing each bank with every other one of said banks and rating the similarity between signals in said banks, said processing means also connecting to individual ones of a second plurality of storage banks, said position signals stored in said first plurality of storage banks are transferred into said second plurality of storage banks in accordance with their rated values whereby to isolate desired information signals from undesired noise signals in said second storage banks to produce a signal in interpretable form and representative of said desired information signal contained in said photon emission.

11. A system as claimed in claim 10 wherein said wide band signal is gamma or X-ray signal.

12. A system as claimed in claim 10 wherein each of said plurality of said first and second storage banks comprises a minimum of three said banks.

13. A system as claimed in claim 10 wherein said radiation detector is a camera having a collimator for accepting photons emitted in a given direction, a scintillation crystal device at an output of said collimator for converting said photons into light energy, an array of photomultiplier tubes oriented in a specific plane relative to said crystal device, a weighted summation circuit for evaluating an output signal of each said photomultiplier, and a comparator for positioning the scintillation events detected by said photomultiplier, said comparator producing said position signals, and said weighted summation circuit producing said energy signals.

14. A system as claimed in claim 10 wherein there is further provided a reproducing device to produce a read-out of said signal in interpretable form.

15. A system as claimed in claim 14 wherein said reproducing device is a visual display connected to said processing circuit means.

16. A system as claimed in claim 10 wherein said digital signals are connected to a formattor circuit which analyses the most significant bits in each of said digital energy signal and connects said digitized position signals associated with said digital energy signal to selected ones of said first plurality of storage banks and in accordance with the said significant bits.

17. A system as claimed in claim 16 wherein said first and second plurality of storage banks are memory portions of said processing circuit means.

18. A system as claimed in claim 17 wherein said processing circuit means is a computer, said memory being a core memory.

19. A system as claimed in claim 17 wherein said processing circuit means is a computer, said memory being stored on a removable non-electronic storage medium, such as a disc or magnetic tape.

20. A system as claimed in claim 17 wherein said weighting means is a function of said processing circuit means.

* * * * *